Dec. 9, 1952            H. GANG            2,620,979
MULTIPLIER-QUOTIENT REGISTER STATE CONTROL MEANS
Original Filed July 22, 1947            4 Sheets-Sheet 1
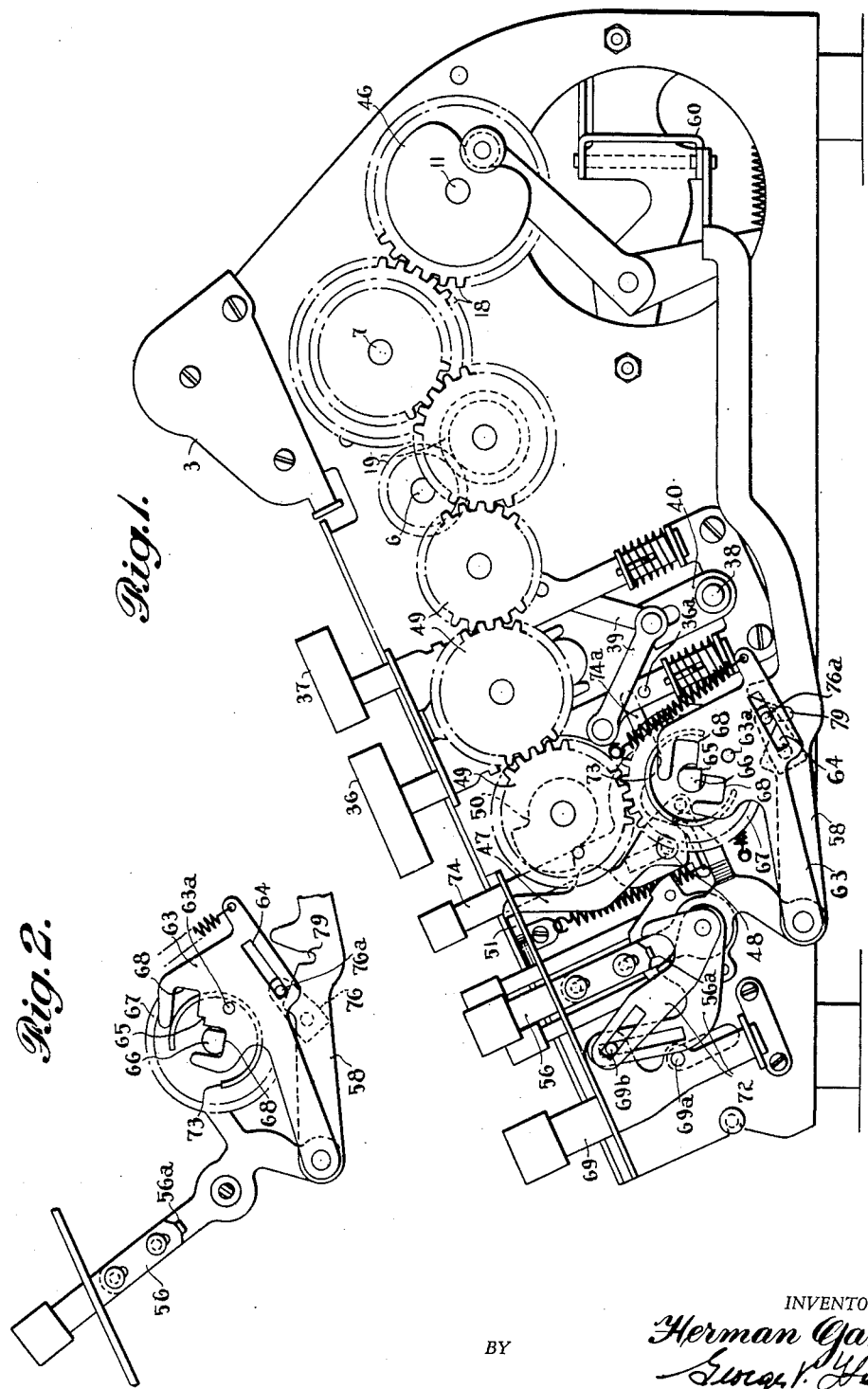
INVENTOR
*Herman Gang,*
*George V. Hall*
ATTORNEY Dec. 9, 1952 H. GANG 2,620,979
MULTIPLIER-QUOTIENT REGISTER STATE CONTROL MEANS
Original Filed July 22, 1947 4 Sheets-Sheet 2
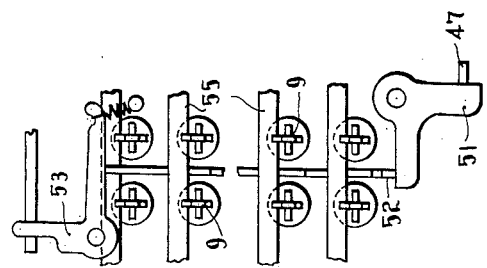
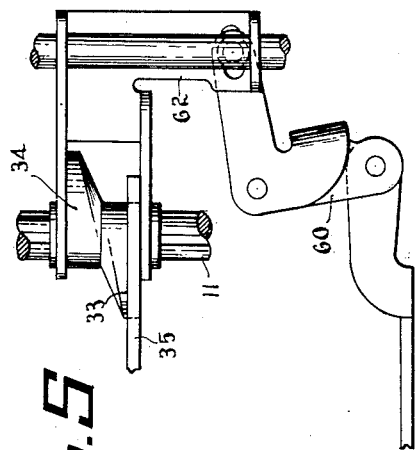
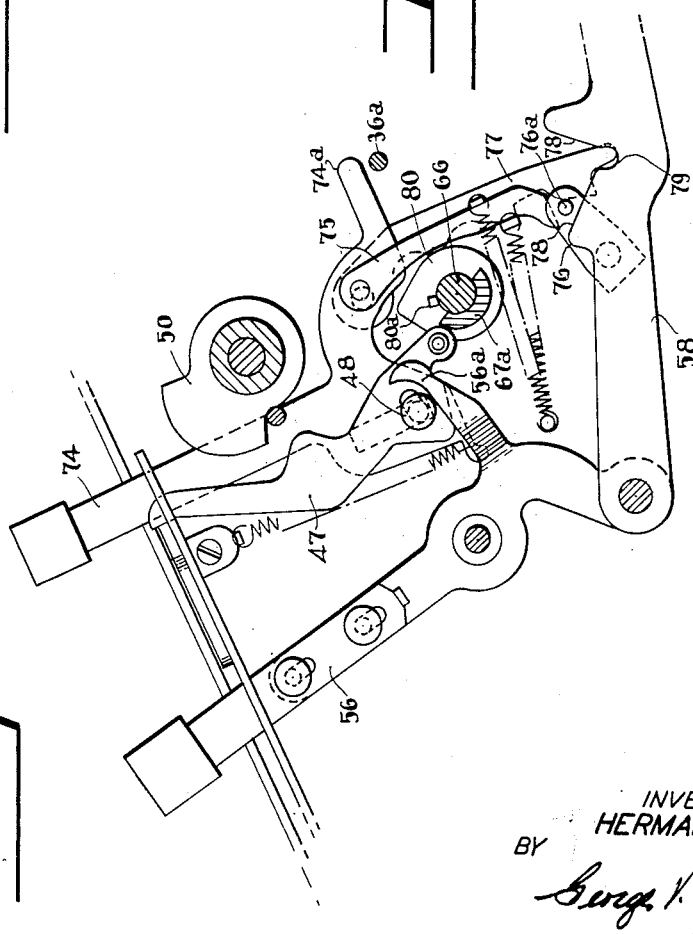
INVENTOR
HERMAN GANG
BY
George V. Hall
ATTORNEY Dec. 9, 1952 H. GANG 2,620,979
MULTIPLIER-QUOTIENT REGISTER STATE CONTROL MEANS
Original Filed July 22, 1947 4 Sheets-Sheet 3

INVENTOR
Herman Gang,
BY George P. Hall,
ATTORNEY

Dec. 9, 1952  H. GANG  2,620,979
MULTIPLIER-QUOTIENT REGISTER STATE CONTROL MEANS
Original Filed July 22, 1947  4 Sheets-Sheet 4

INVENTOR
Herman Gang,
BY George V. Hall
ATTORNEY

Patented Dec. 9, 1952

2,620,979

UNITED STATES PATENT OFFICE 2,620,979

MULTIPLIER-QUOTIENT REGISTER STATE CONTROL MEANS

Herman Gang, Livingston, N. J., assignor to Monroe Calculating Machine Company, Orange, N. J., a corporation of Delaware Continuation of abandoned application Serial No. 762,614, July 22, 1947. This application March 7, 1951, Serial No. 214,420

8 Claims. (Cl. 235—79)

1

The present application is a continuation of application Ser. #762,614, filed on July 22, 1947 (now abandoned).

The invention relates to controls for driving means for calculating machine registers. Particularly, the invention is adaptable to control a multiplier-quotient register drive which has a neutral non-driving position and which is independently reversible with respect to a reversible drive for a product-dividend register.

In certain types of calculating machines adapted to perform problems of multiplication and of division, it is necessary to set the drive means for the multiplier-quotient register to effect like or unlike registrations respectively, in arithmetical sign, the registrations effected in the product-dividend register.

Automatically operable means for effecting the desired settings of reversible drive means for a multiplier-quotient register is disclosed in Pat. #2,260,291 issued to Edwin F. Britten, Jr. According to said disclosure, upon initial operation of reversible differential actuators for a product-dividend register, an independently reversible drive means for a counter actuator for a multiplier-quotient register is set from a neutral position into position to effect registrations alternatively like or unlike, in arithmetical sign, the registrations effected in the product-dividend register. The reversible drive means of the counter actuator retains its setting at the end of a calculation and the automatic setting means is effective only if the drive means is in neutral position. Therefore, manually operable means is provided to restore the drive means to neutral so that the proper setting will be assured upon initiation of a following calculation. The arrangement is such that the drive means will be in an active position, or will be actively positioned upon initial operation of the differential actuators; therefore a count will invariably be registered in the multiplier-quotient register. This obviously necessitates a clearing operation for the multiplier-quotient register, when for example, a dividend is registered in the product-dividend register. The devices of the present invention eliminate the necessity for the above noted clearing operation following a factor entering operation and at the same time render automatic setting means for reversible drive means of a counter actuator effective for a following calculation in a machine wherein such setting means operates substantially in accordance with the afore noted patent.

According to the present invention, depression of a factor set-up key is effective to cause a single cycle of the differential actuators and thereby enter a value set on the keyboard into the product-dividend register. Concurrently reversible drive means for the counter actuator, if in an effective position, is adjusted to neutral position, and the setting means therefore is disabled during the value entering operation. However, at the conclusion of the value entering operation the setting means is re-enabled. If, when the set-up key is depressed, the drive means has been adjusted to neutral position, by other means hereinafter described, the disabling and re-enabling of the setting means will be effected. In either instance, no registration will be effected in the multiplier-quotient register during the factor entering operation, and the setting means will be conditioned to properly adjust the drive means for the following calculation.

The setting means for the reversible drive means for the counter actuator, with which the invention is herein disclosed, operates substantially in accordance with the principles disclosed in the afore noted Pat. #2,260,291. There is, however, considerable deviation therefrom in the structure and the mechanical arrangement of the parts. Furthermore, the reversible drive for the counter actuator, in lieu of the reversing gear arrangement disclosed in said patent, comprises a pair of axially adjustable reversing cams which operate substantially in accordance with the principles of Pat. #2,273,237 issued to Edward C. Walter. The invention, however, will best be understood from the following description of a preferred embodiment with reference to the accompanying drawings in which:

Fig. 1 is a right side elevation of a calculating machine illustrating the control devices of the invention adjusted to locate the counter actuator in neutral position and the setting means for the actuator rendered effective.

Fig. 2 is a fragmentary detail side view with parts broken away showing portions of the control devices in position after the setting means has adjusted the counter actuator to an effective position.

Fig. 3 is a fragmentary detail side view with parts broken away showing other portions of the control devices with the parts in the position shown in Fig. 2.

Fig. 4 is a detail fragmentary plan view, showing the keyboard clearing and the tripping means for the machine stopping means with parts broken away.

Fig. 5 is a detail plan view of the reversing cams of the counter actuator.

Registering mechanism (general operation)

Figure 6:
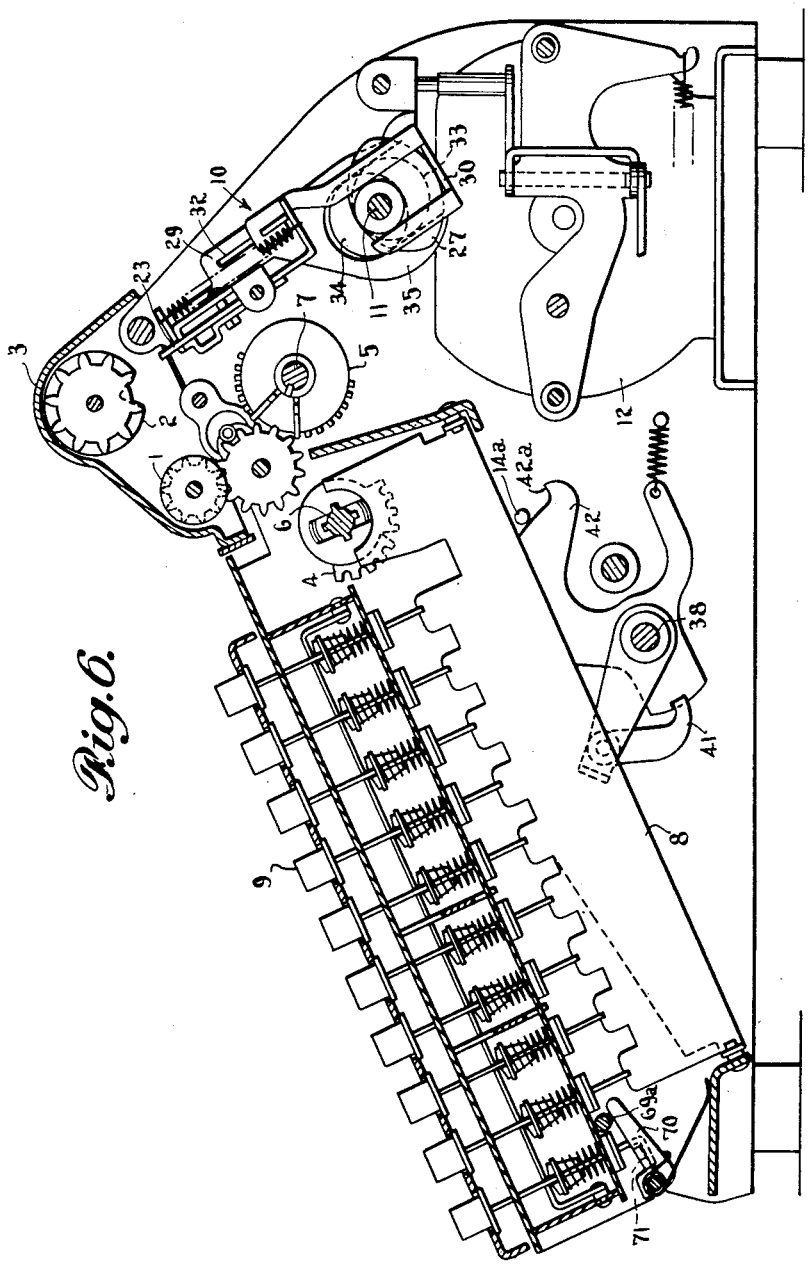
Fig. 6 is a vertical longitudinal section of the machine showing the keyboard, differential actuators for the product-dividend register and the counter actuator for the multiplier-quotient register.

The product-dividend register 1 and the multiplier-quotient register 2 are mounted in a denominationally shiftable carriage 3 (Fig. 6). The actuating mechanism for the product-dividend register 1 comprises the differentially settable actuators 4 and the tens transfer actuators 5 which are mounted on and driven by transversely extending shafts 6 and 7 respectively in the body of the machine. The differential actuators 4 are settable by selection bails 8 in accordance with depressed keys 9 of the keyboard. The counter actuator for the multiplier-quotient register 2, designated generally by the reference numeral 10, also mounted in the body of the machine, is driven by the transversely extending shaft 11.

Figure 7:
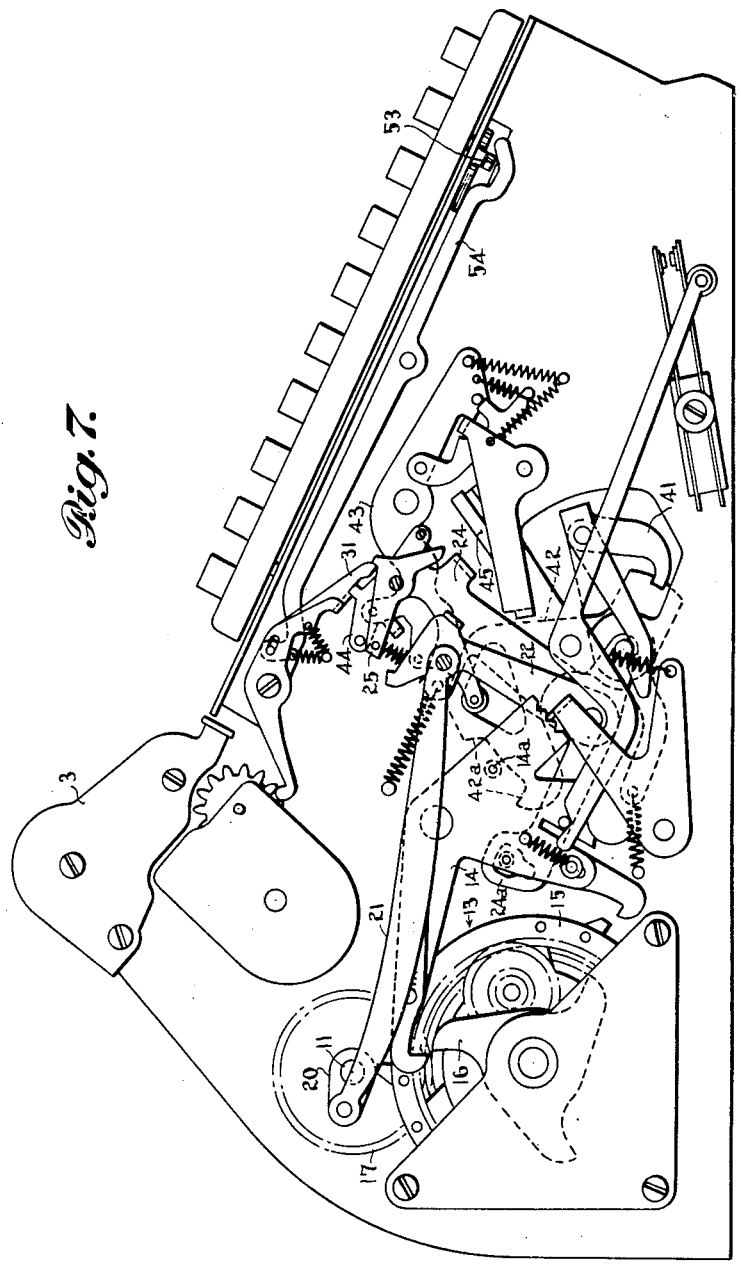
Fig. 7 is a left side elevation of the machine showing the actuator driving means and the stopping means therefor.

Actuator shafts 6, 7 and 11 are driven by the motor 12 (Fig. 6) through the clutching and reversing differential drive 13 (Fig. 7). Differential drive 13 is constructed and operates substially in accordance with the disclosure of Pat. #1,566,650, issued to George C. Chase and is controlled by a compound clutch lever 14 which is fulcrumed on the machine frame. Upon rocking of clutch lever 14 from neutral in one or the reverse directions, the lever will engage and arrest rotation of clutch element 15 or 16 which will result in transmission of the drive in one or the reverse direction through gear 17 to counter actuator shaft 11. From shaft 11, the drive is transmitted at a one to one ratio through gears 18, 19 (Fig. 1) to tens transfer actuator shaft 7 and to differential actuator shaft 6.

Drive means for the counter actuator 10 includes a drive control unit comprising independent reversing means which is adjustable into either of two direction controlling positions so that the counter actuator may be operated in the same or the reverse direction with respect to differential and tens transfer actuators 4 and 5 of the product-dividend register; or to a neutral intermediate position whereby the counter actuator is rendered ineffective to effect a count.

Actuator 10 comprises a series of counting-fingers 23 (one of which is shown in Fig. 6) which are slidably mounted for vertical movement in a transversely and pivotally mounted frame 29. Fingers 23 are spring urged upwardly but are normally held in lowered position by a cam 27 fixed on shaft 11 and engaging a plate 30 having connection with a cross bar 32 which engages the bent over lower ends of said fingers. Upon rotation of shaft 11 in either direction, cam 27 will release and then redepress plate 30. Therefore, fingers 23 will be raised and lowered under control of cam 27. The reversing or direction controlling means for counting fingers 23 comprises a pair of integral and diametrically opposed cams 33 and 34 which are axially spaced and splined on shaft 11 to permit longitudinal adjustment. Thus, the cams may be adjusted as a unit to engage one or the other with a fork 35 which is fixed to frame 29, or to a neutral position thereby locating the cams upon opposite sides and out of active engagement with the fork.

As fingers 23 are raised under control of cam 27, one or the other of cams 33 or 34 if engaged with fork 35 will rock frame 29 and fingers 23 in one or the reverse direction and accordingly register a count in multiplier-quotient register 2. That is, the lowest order finger 23 when raised will engage a tooth space of an aligned numeral wheel gear and will effect a count of one in the related numeral wheel either like or unlike the registration being made simultaneously in product-dividend register 1. The higher order fingers 23 operate to effect tens transfers and are restrained from operation, unless a tens transfer is indicated, by notched disks, one of which is secured to each numeral wheel of register 2. When cams 33, 34 are adjusted to neutral position at opposite sides of fork 35, fingers 23 will be raised and lowered upon operation of cam 27 without the rocking motion and therefore no registration will be effected in the multiplier-quotient register.

Registering mechanism (plus and minus bar control)

Clutch lever 14 is controlled by plus and minus bars 36, 37 substantially as disclosed in Pat. #2,096,465, to Austin A. Overbury to which reference is made for the operational details not disclosed herein. Depression of plus bar 36 or minus bar 37 (Fig. 1) will rock a shaft 38 clockwise or counter-clockwise respectively through linkage 39 and crank 40. Shaft 38 extends across the machine and has coupling connection 41 with a spring centralized setting plate 42 (Figs. 6 and 7) at the inner side of the left side frame. Plate 42, therefore, will be rocked counter-clockwise (Fig. 7) upon depression of plus bar 36 and clockwise upon depression of minus bar 37. Setting plate 42 is provided with a pair of opposed shoulders 42a adapted respectively for engagement with a pin 14a of clutch lever 14 when the plate is rocked from central position. Therefore upon depression of plus bar 36 a shoulder 42a of plate 42 will rock clutch lever 14 clockwise (Fig. 7) to engage the transmission 13 for positive registration and upon depression of minus bar 37, the clutch lever will be rocked counter-clockwise to engage the transmission for negative registration.

Full cycle stopping means

Means settable upon depression of the plus bar 36 or minus bar 37 is operable, upon release of the depressed bar, to stop the registering mechanism in full cycle position at the end of the current registering cycle. When setting plate 42 is rocked to engage the drive, one or the other of a pair of opposed cam faces will rock and hold a spring retracted lever 43 counter-clockwise (Fig. 7). A pawl 44 mounted on lever 43 is spring urged counter-clockwise but when lever 43 is in normal clockwise position a suitable stop pin (not shown) holds pawl 44 in the clockwise position shown in Fig. 7. When lever 43 is moved counter-clockwise, pawl 44 will be moved away from the stop pin and a lug of the pawl will be rocked counter-clockwise into position beneath a lug of a trigger 31. Trigger 31 normally engages a lug on a spring urged pawl 25 which is mounted on the upper end of a stop arm 24. A rock arm 22 has common pivotal mounting with arm 24 and is reciprocally driven in time with the actuating mechanism by a link 21 and a crank 20 which is fixed on tens transfer actuator shaft 11. Upon release of plus bar 36 or minus bar 37, setting plate 42 will be centralized and lever 43 will be rocked clockwise to normal thereby engaging the lug of pawl 44 with the lug of trigger 31 to raise the trigger and release pawl 25. As the parts approach full cycle position, a shoulder at the upper end of rock arm 22 will engage released pawl 25 and arm 24 will be carried against a stop 45 to arrest the movement of the parts in their over run beyond full cycle position. As arm 24 is carried to stop 45, a cam slot of an extension 24a of the arm will engage a pin of clutch lever 14 thereby moving the lever to neutral position to disconnect the drive. Upon rebound of the parts from stop 45, the registering mechanism will be located in full cycle position by a locator cam 46 (Fig. 1), and pawl 44 having been moved to normal in its tripping operation, will permit trigger 31 to re-engage pawl 25.

*Registering mechanism (non-repeat means)*

With plus or minus bar 36, 37 held depressed, selectively operable means are provided to limit the registering mechanism to a single cycle of operation.

An upstanding trip arm 47 (Figs. 1 and 3) has a slot at its lower end whereby pivotal mounting is provided on a pin 48 and lateral adjustment of the lower end of the arm is permitted. A gear train comprising gears 49 (Fig. 1), driven from the actuator drive gears, extends toward the front of the machine. A lost motion cam 50 (Figs. 1 and 3) is loosely mounted on the shaft of the forwardmost gear 49 and a pin on the gear is adapted to engage and drive the cam. With the lower end of arm 47 in the released position shown in Fig. 3, cam 50 operating in timed relation with the registering mechanism will be ineffective to rock said arm but will adjust its lower end toward the front of the machine. Thus the non-repeat means is disabled and the machine will cycle as long as a plus or minus bar is held depressed. When the lower end of arm 47 is adjusted and held toward the rear (as hereinafter described) cam 50 will be effective, during the first cycle of the registering mechanism in either direction, to rock said arm and thereby trip the stopping means to terminate the registration upon completion of the single cycle as follows.

The upper end of trip arm 47 engages an arm of a bell crank 51 (Fig. 4) and the other arm of the bell crank engages a slide 52 which extends across the machine and into engagement with an arm of a bell crank 53. The other arm of bell crank 53 engages the forward end of an intermediately pivoted lever 54 (Fig. 7) and the rearward end of the lever has slot and pin connection with trigger 31. Slide 52 has suitable lugs which engage latching bails 55 (Fig. 4) which hold depressed keys 9 of the keyboard against retraction. When trip arm 47 is rocked, bell crank 51 will be rocked thereby moving slide 52 to rock latching bails 55 to clear the keyboard; and also slide 52 will rock bell crank 53, lever 54 and trigger 31 to release pawl 25 and thereby operate the stopping means as heretofore described. Setting plate 42, however, must be centralized while a plus or minus bar is held depressed to permit clutch lever 14 to be moved to neutral. For this end a pin on stop arm 24 will release coupling 41 thereby permitting the setting plate to be spring centralized and upon release of the depressed plus or minus bar the coupling will be moved into engaging relation with the setting plate.

*The change lever (manual setting)*

The change lever 56 (Figs. 1, 2 and 3) may be manually set toward the front and toward the rear of the machine to adjust the heretofore described reversing cams 33, 34 of counter actuator 10 to effect the like and the unlike sign registrations respectively; or to the intermediate position whereby the counter actuator is rendered ineffective.

Change lever 56 is fulcrumed intermediate its ends on the right side frame. A link 58 has pivotal connnection to the lower arm of change lever 56 and extends to the rear of the machine where it has pivotal connection with an arm of a bell crank 60. The other arm of bell crank 60 has slot and pin connection with a slidably mounted forked plate 62 (Fig. 5) which engages the outer sides of reversing cams 33, 34. Upon counter-clockwise movement of change lever 56 toward the front of the machine, as shown in Figs. 2 and 3, link 58 will be moved toward the rear thereby rocking bell crank 60 and moving forked plate 62 and cams 33, 34 toward the left of the machine to engage the rightmost cam 33 with the fork 35 of actuator 10, as shown in Fig. 5, to control like sign registration. Conversely, upon adjustment of change lever 56 toward the rear of the machine, the leftmost cam 34 will be moved to engage fork 35 to control unlike sign registration. Upon movement of change lever to its intermediate position, cams 33, 34 will be adjusted to positions at opposite sides of fork 35 and the counter actuator 10 will be disabled.

Change lever 56 is yieldably held in its adjusted positions by a locator arm 63 (Figs. 1 and 2) which has common pivotal mounting with link 58 on the change lever and which is spring urged counter-clockwise. Change lever 56 is held in its intermediate position (Fig. 1) by engagement of a notch 65 in the upper edge of arm 63 with the wedge shaped end of a stub shaft 66 on which a gear 67 is rotatably mounted. Arm 63 is recessed at 68 on either side of notch 65 and when the change lever is moved to either of its active positions (Fig. 2), arm 63 is spring raised to engage either one or the other of recesses 68 with shaft 66.

Means operating in conjunction with a keyboard clearing operation is provided to adjust change lever 56 to its intermediate position, so that the automatic setting means (to be described) will be rendered effective.

A pin 69a on the stem of a clear key 69 (Fig. 1) overlies an arm 70 fixed to a bail 71 (Fig. 6) which overlies the forwardly bent ends of the stems of the zero keys. The keyboard is of well known construction wherein the depression of any key operates to release any set key in the related column. Therefore, upon depression of clear key 69, pin 69a will rock bail 71 and depress all of the zero keys and thereby clear the keyboard.

Another pin 69b, mounted on the stem of clear key 69, has slotted connection with scissor plates 72. The scissor plates have common pivotal mounting with change lever 56, and upon depression of clear key 69, pin 69b will move the active edges of the scissor plates toward a common center. A lug 56a carried by the change lever is positioned between the edges of the scissor plates and as these edges are moved toward each other, upon depression of clear key 69, one or the other of the edges will engage lug 56a and move change lever 56 to its intermediate position. Lug 56a is mounted upon a slidable portion of change lever 56 so that the lug may be raised above the scissor plates to render the plates ineffective upon depression of the clear key 69. This is desirable in performing certain types of calculations.

Change lever (automatic setting)

The automatic setting means for change lever 56 comprises a power train operable in time with the actuators and effective only when the lever is in its intermediate position. The setting means includes the gear 67 (Figs. 1 and 2) rotatably mounted on stub shaft 66 and driven through the gear train 49 at a one-to-one ratio with the register actuating mechanism. Gear 67 is provided with a segmental flange 73, the ends of which lie, when the parts are in full cycle position and change lever 56 is in its intermediate position, at either side of a pin 63a mounted on and extending inwardly of locator arm 63.

Upon initial rotation of the actuators in either direction, one or the other end of flange 73 will engage pin 63a thereby unseating locator arm 63 from its intermediate position and urging it in one or the other direction where it will be raised and located by registration of one or the other of its recesses 68 with shaft 66 as shown in Fig. 2. Accordingly, change lever 56, having connection with arm 63, will be rocked to one or the other of its active positions. Upon further rotation of gear 67 and flange 73 as the registering mechanism is operated, the change lever will remain adjusted in active position as pin 63a raised with arm 63 will have been moved inwardly between the ends of the flange and out of the path of movement thereof as shown in Fig. 2. Positive registration, as in a program of multiplication, will result in counter-clockwise rotation of gear 67 and flange 73 thereby setting the change lever counter-clockwise so that like sign registration will be effected in the multiplier-quotient register. Conversely minus registration, as effected in the initial operation of a division program, will result in clockwise rotation of gear 67 and flange 73 and the change lever will be set to control unlike sign registration.

Factor entering means and disablement of counter actuator

The devices of the invention provide means whereby a single cycle of the registering mechanism is effected to enter a value set on the keyboard into product-dividend register as a factor such as a dividend. The means whereby the factor entering operation is initiated restores change lever 56, if in one of its active positions, to its intermediate position. The setting means, however, for the change lever is disabled during the single registering cycle and then re-enabled at the termination of the cycle. Thus no count will be registered in the multiplier-quotient register and the setting means will be rendered operable to effect the proper setting of the change lever for the following calculation.

The devices comprise a spring retracted set-up key 74 (Figs. 1 and 3) having an arm 74a overlying a pin 36a on the stem of plus bar 36. Pivotally mounted at its upper end on the stem of key 74 is an arm 75, the lower free end of which overlies a pin 76a on a crank 76 which is pivotally mounted to the machine side frame. Arm 75 is spring urged clockwise into engagement with a lug on a latch arm 77. Latch arm 77 is pivotally mounted at its upper end to the machine side frame and is spring urged clockwise into engagement, adjacent its lower shouldered latch end, with pin 76a of crank 76. The upper edge of link 58 is provided with a pair of oppositely disposed cam faces 78 extending from opposite sides respectively of a centering recess 79. The pin 76a of crank 76 extends outwardly above link 58 and into a slot 64 of locator arm 63.

Upon depression of set-up key 74, the free end of arm 75 will engage and depress pin 76a thereby rocking crank 76. If change lever 56 is in one of its active positions (Figs. 2 and 3), pin 76a, upon depression, will engage one or the other of cam edges 78 of link 58 and move said link and the connected locator arm 63 and change lever 56 to their intermediate position at which time pin 76a will have entered centering recess 79. Furthermore in its downward movement, pin 76a will displace locator arm 63 clockwise and its pin 63a will be moved to the outside and out of the path of movement of flange 73 thereby disabling the change lever setting means. As the parts are moved into position, as above described, arm 74a of the set-up key 74 will depress the plus bar and positive operation of the registering mechanism will be initiated. As change lever 56 is moved to its intermediate position, the non-repeat means is rendered effective. Such means comprises an arm 56a of the change lever; and as the lever is moved to its intermediate position the arm will be moved into blocking engagement with a roller at the lower end of trip arm 47. Cam 50 will now be effective to rock trip arm 47 so that the registration will be limited to a single cycle and the keyboard cleared. As pin 76a completes its downward movement, the shouldered free end of latch arm 77 will be moved into latching position above said pin. Therefore pin 76a and the connected parts will be held in fully depressed position should set-up key 74 be released during the set-up cycle.

Upon the overrun of the registering means in the stopping operation, a cam 80 (Fig. 3) will rock latch arm 77 and arm 75 counter-clockwise to release pin 76a and the parts connected therewith. Cam 80 is loosely mounted on shaft 66 and has a lug 80a which, when the registering means makes the overrun, is engaged by one or the other side of a cut away hub 67a carried by gear 67. Upon release of the parts by latch 77, locator arm 63 will be moved counter-clockwise. At this time, arm 63 will not be afforded its full movement as the registering mechanism will be in its overrun beyond full cycle position and pin 63a will engage the outer side of flange 73. However, when the registering means rebounds to full cycle position, pin 63a will be allowed passage between the ends of flange 73 and locator arm 63 will be moved counter-clockwise to seat its notch 65 on shaft 66. Obviously if change lever 56 is in its intermediate position when set-up key 74 is depressed, pin 76a of crank 76 will be allowed direct entrance into recess 79 of link 58 and the resulting operations will all be effected identically as described in the foregoing.

The foregoing description relates to the setting up of a dividend. However, a cycle of differential actuators of a calculating machine has been used in the art to enter a multiplier in a series of storage devices, as for example, in applicant's Pat. #2,531,206. Obviously, therefore, it is within the scope of the present invention to control registration in a multiplier-quotient register as an incident to a multiplier set-up operation. The broad concept of the invention contemplates means for disabling the counter actuator during a factor entering operation in conjunction with automatic means conditioned to re-enable the actuator at the end of the factor entering operation. Although the devices of the invention have been disclosed in conjunction with means which enable and at the same time control reversibility of the actuator, it will be apparent that the invention would be equally usable with means effecting only the disabling and enabling functions in which instance one of the principal objects of the invention would be achieved i. e. the elimination of a count in the multiplier-quotient register. It will be understood, therefore, that although one of the principal uses of the invention is its application in connection with change lever control, the invention is not necessarily restricted thereto.

I claim:

1. In a motor driven calculating machine having a product-dividend register, a multiplier-quotient register, motor driven actuating means including differential actuators for said product-dividend register and a counter actuator for said multiplier-quotient register, and a drive control unit adjustable into position to enable or alternatively into position to disable said counter actuator; the combination of a power train driven in timed relation with said actuating means and operable upon initial movement thereof to adjust said drive control unit from disabling to enabling position, a member between said power train and said drive control unit displaceable to render said train ineffective, an operating key, adjusting means operable upon depression of said key to displace said member, means operable upon depression of said key to initiate operating of said actuating means, and means operable to restore said member.

2. In a motor driven calculating machine having a product-dividend register, a multiplier-quotient register, motor driven actuating means including differential actuators for said product-dividend register and a counter actuator for said multiplier-quotient register, and a drive control unit adjustable into position to enable or alternatively into position to disable said counter actuator; the combination of a power train driven in timed relation with said actuating means and operable upon initial movement thereof to adjust said drive control unit from disabling to enabling position, a member between said power train and said drive control unit displaceable to render said train ineffective, an operating key, adjusting means operable upon depression of said key to adjust said drive control unit to disabling position and to displace said member, means operable upon depression of said key to initiate operation of said actuating means and means operable to restore said member.

3. In a motor driven calculating machine having a product-dividend register, a multiplier-quotient register, reversible motor driven actuating means including differential actuators for said product-dividend register and a counter actuator for said multiplier-quotient register, and an independent reversal control unit adjustable from a neutral position, wherein said counter actuator is disabled, into one or alternatively another effective position wherein said counter actuator is operable in like or unlike direction respectively with relation to said differential actuators; the combination of a power train driven in timed relation with said actuating means and operable to adjust said reversal control unit into one or alternatively its other effective position in dependence upon the direction of the initial registering movement of said differential actuators, a member between said power train and said reversal control unit displaceable to render said train ineffective, an operating key, adjusting means operable upon depression of said key to displace said member, means operable upon depression of said key to initiate operation of said actuating means, and means operable to restore said member.

4. The invention according to claim 3 wherein the adjusting means is operable upon depression of the operating key to adjust the reversal control unit to neutral position.

5. The invention according to claim 3 wherein the means operable to restore said member is responsive to the operation of the actuating means.

6. In a motor driven calculating machine having a product-divider register, a multiplier-quotient register, reversible motor driven actuating means including differential actuators for said product-dividend register and a counter actutor for said multiplier-quotient register, and an independent reversal control unit adjustable from a neutral position, wherein said counter actuator is disabled, into one or alternatively another effective position wherein said counter actuator is operable in like or unlike direction respectively with relation to said differential actuators; the combination of a power train driven in timed relation with said actuating means and operable to adjust said reversal control unit into one or alternatively its other effective position in dependence upon the direction of the initial registering movement of said differential actuators, a spring retracted member between said power train and said reversal control unit displaceable to render said train ineffective, an operating key, adjusting means operable upon depression of said key to displace said member, a latch operable to hold said member displaced, means operable upon depression of said key to initiate operation of said actuating means, and means responsive to the operation of said actuating means for releasing said latch.

7. The invention according to claim 6 characterized by the provision of means for adjusting the reversal control unit to neutral position upon depression of the operating key comprising said adjusting means.

8. In a motor driven calculating machine having a product-dividend register, a multiplier-quotient register, cyclic reversible motor driven actuating means including differential actuators for said product-dividend register and a counter actuator for said multiplier-quotient register, full cycle stopping means for said actuating means, and an independent reversal control unit adjustable from a neutral position, wherein said counter actuator is disabled, into one or alternatively another effective position wherein said counter actuator is operable in like or unlike direction respectively with relation to said differential actuators; the combination of a power train driven in timed relation with said actuating means and operable to adjust said reversal control unit into one or alternatively its other effective position in independence upon the direction of the initial registering movement of said differential actuators, a member between said power train and said reversal control unit displaceable to render said train ineffective, non-repeat means operable to initiate operation of said stopping means upon a single cycle of operation of said actuating means, an element adjustable to enable or to disable said non-repeat means, an operating key, adjusting means operable upon depression of said key to displace said member, to adjust said reversal control unit to neutral position and to adjust said element to enabling position, means operable upon depression of said key to initiate operation of said actuating means, and means operable to restore said member.

HERMAN GANG.

REFERENCES CITED

The following references are of record in the file of this patent:

UNITED STATES PATENTS

| Number | Name | Date |
|---|---|---|
| 1,400,004 | Schaller | Dec. 13, 1921 |
| 1,504,741 | Chase | Aug. 12, 1924 |
| 2,034,085 | Chase | Mar. 17, 1936 |
| 2,160,361 | Hilder | May 30, 1939 |
| 2,227,785 | Kottmann | Jan. 7, 1941 |
| 2,260,291 | Britten | Oct. 28, 1941 |
| 2,270,793 | Britten | Jan. 20, 1942 |
| 2,273,237 | Walter | Feb. 17, 1942 |
| 2,366,345 | Machado | Jan. 2, 1945 |
| 2,393,018 | Boyden | Jan. 15, 1946 |